(12) United States Patent
Imamura et al.

(10) Patent No.: US 11,110,861 B2
(45) Date of Patent: Sep. 7, 2021

(54) DISPLAY SYSTEM AND ELECTRONIC MIRROR SYSTEM INCLUDING THE DISPLAY SYSTEM

(71) Applicant: Panasonic Intellectual Property Management Co., Ltd., Osaka (JP)

(72) Inventors: Norihiro Imamura, Osaka (JP);
Michihiro Yamagata, Osaka (JP);
Kenji Nagatomi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/031,270

(22) Filed: Sep. 24, 2020

(65) Prior Publication Data

US 2021/0101531 A1   Apr. 8, 2021

(30) Foreign Application Priority Data

Oct. 8, 2019 (JP) .............................. JP2019-185417
Jun. 9, 2020 (JP) .............................. JP2020-100344

(51) Int. Cl.
*B60R 1/00* (2006.01)
*G02B 5/09* (2006.01)
*G02B 17/00* (2006.01)
*G02B 5/30* (2006.01)
*G06T 5/00* (2006.01)
(Continued)

(52) U.S. Cl.
CPC ................. *B60R 1/00* (2013.01); *G02B 5/09* (2013.01); *G02B 5/3041* (2013.01); *G02B 17/008* (2013.01); *G06T 5/006* (2013.01); *H04N 5/2628* (2013.01); *H04N 7/183* (2013.01);
(Continued)

(58) Field of Classification Search
None
See application file for complete search history.

(56) References Cited

U.S. PATENT DOCUMENTS 10,120,188 B2   11/2018   Matsuzaki et al.
10,302,943 B2   5/2019   Asai
(Continued)

FOREIGN PATENT DOCUMENTS

JP   2014-130269 A   7/2014
JP   2017-210229 A   11/2017

OTHER PUBLICATIONS

U.S. Appl. No. 17/080,366 to Norihiro Imamura et al., filed Oct. 26, 2020.
(Continued)

*Primary Examiner* — Rebecca A Volentine
(74) *Attorney, Agent, or Firm* — Greenblum & Bernstein, P.L.C.

(57) ABSTRACT

A display system includes a display device, a first mirror, and a second mirror. The display device includes a display surface that displays a first image. Light emitted by the display device is incident directly or indirectly on the first mirror. The first mirror reflects the light incident. The light reflected by the first mirror is directly or indirectly incident on the second mirror. The second mirror reflects, toward an eye-box, the light incident. The light reflected by the second mirror enters an eye of an observer present within the eye-box to display, on the eye of the observer, a second image based on the first image. The first mirror is a Fresnel mirror.

14 Claims, 13 Drawing Sheets

(51) Int. Cl.
H04N 5/262 (2006.01)
H04N 7/18 (2006.01)

(52) U.S. Cl.
CPC ....... *B60R 2300/10* (2013.01); *B60R 2300/20* (2013.01); *B60R 2300/802* (2013.01)

(56) References Cited

U.S. PATENT DOCUMENTS

| | | | |
|---|---|---|---|
| 10,427,598 | B2 | 10/2019 | Yamagata et al. |
| 10,525,886 | B2 | 1/2020 | Imamura et al. |
| 10,613,325 | B2 | 4/2020 | Matsuzaki et al. |
| 10,642,032 | B2 | 5/2020 | Kasazumi et al. |
| 10,670,780 | B2 | 6/2020 | Kasazumi et al. |
| 10,730,440 | B2 | 8/2020 | Imamura et al. |
| 10,809,526 | B2 | 10/2020 | Matsuzaki et al. |
| 10,836,314 | B2 | 11/2020 | Imamura et al. |
| 10,882,454 | B2 | 1/2021 | Imamura et al. |
| 2010/0053753 | A1* | 3/2010 | Nestorovic ........ G02B 27/0101 359/488.01 |
| 2010/0073579 | A1* | 3/2010 | Okada ................ G02B 27/0101 348/744 |
| 2013/0010366 | A1* | 1/2013 | Nakamura ............. B60K 35/00 359/633 |
| 2015/0198802 | A1* | 7/2015 | Ando ................. G02B 27/0905 359/200.8 |
| 2017/0269428 | A1* | 9/2017 | Otani ................. G02B 27/0101 |
| 2018/0252917 | A1* | 9/2018 | Takahashi .......... G02B 27/0101 |
| 2019/0101751 | A1* | 4/2019 | Chou .................... G09G 5/373 |
| 2019/0293931 | A1* | 9/2019 | Yamamoto ......... G02B 27/0149 |
| 2019/0302583 | A1 | 10/2019 | Taniguchi et al. |
| 2020/0070726 | A1 | 3/2020 | Imamura et al. |
| 2020/0070729 | A1 | 3/2020 | Imamura et al. |
| 2020/0228791 | A1* | 7/2020 | Kusafuka ........... G02B 27/0101 |
| 2020/0377021 | A1 | 12/2020 | So et al. |

OTHER PUBLICATIONS

U.S. Appl. No. 17/125,578 to Norihiro Imamura et al., filed Dec. 17, 2020.

Office Action issued in Japan Counterpart Patent Appl. No. 2020-100344, dated Jun. 29, 2021, along with an English translation thereof.

\* cited by examiner

DISPLAY SYSTEM AND ELECTRONIC MIRROR SYSTEM INCLUDING THE DISPLAY SYSTEM

CROSS REFERENCE TO RELATED APPLICATIONS

The present application is based on and claims priority of Japanese Patent Application No. 2019-185417 filed on Oct. 8, 2019 and Japanese Patent Application No. 2020-100344 filed on Jun. 9, 2020.

FIELD

The present disclosure relates to a display system and an electronic mirror system including the display system. More specifically, the present disclosure relates to a display system that displays images and an electronic mirror system including the display system.

BACKGROUND

Patent Literature (PTL) 1 discloses a display device for a vehicle, including a display that displays videos, a reflector that reflects the videos displayed on the display, and a concave mirror that reflects the videos reflected by the reflector.

CITATION LIST

Patent Literature

PTL 1: Japanese Unexamined Patent Application Publication No. 2017-210229

Summary

However, the display device for a vehicle according to PTL 1 can be improved upon. In view of this, the present disclosure provides a display system capable of improving upon the above related art.

A display system according to one aspect of the present disclosure includes: a display device including a display surface that displays a first image; a first mirror on which light emitted by the display device is directly or indirectly incident and which reflects the light incident; and a second mirror on which the light reflected by the first mirror is directly or indirectly incident and which reflects the light incident toward an eye-box. The light reflected by the second mirror enters an eye of an observer present within the eye-box to display, on the eye of the observer, a second image based on the first image. The first mirror is a Fresnel mirror.

An electronic mirror system according to one aspect of the present disclosure includes: the display system according to any one of claims 1 to 14; and a camera that is mounted in a moving object and images an area behind the moving object. The display device displays, on the display surface, the first image based on an image captured by the camera.

A display device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Embodiment (1) Outline

Figure 5:
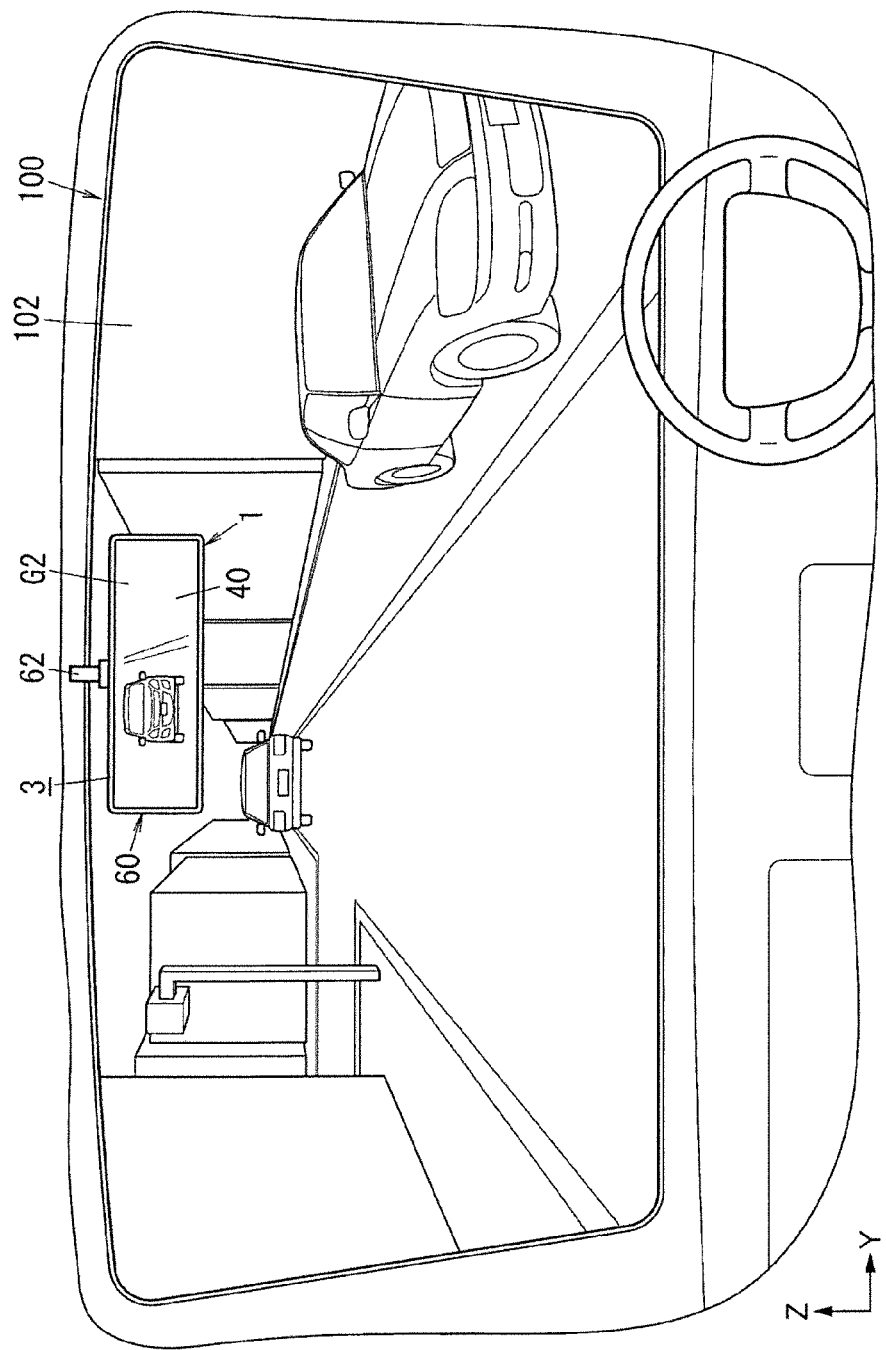
FIG. 5 is an illustration of an example display by the electronic mirror system.

The figures referenced to in the following exemplary embodiment are schematic representations and the ratios of the sizes and thicknesses among the constituent elements are, in the figures, not necessarily drawn strictly to scale. In the following description, an X-axis extends in the longitudinal direction of a moving object (e.g. a motor vehicle) and a Z-axis extends in the vertical direction of the moving object in FIGS. 1 and 3. A Y-axis extends in the transverse direction of the moving object in FIG. 5. In addition, the positive side of the X-axis is defined as the front, the positive side of the Y-axis as the right, and the positive side of the Z-axis as the top. Note that these directions are mere examples and not intended to limit the directions when using display system 1 and electronic mirror system 4. The arrows indicating the directions in the figures are for illustrative only and insubstantial.

In the present disclosure, the term "parallel" may include not only the relationship "completely parallel" but also the relationship "substantially parallel". Specifically, the term "parallel" means that two straight targeted lines form an angle (i.e., an acute angle) ranging from 0 degrees to 10 degrees. In one more preferred embodiment, the term "parallel" means that two straight targeted lines form an angle (i.e., an acute angle) ranging from 0 degrees to 5 degrees.

Figure 1:
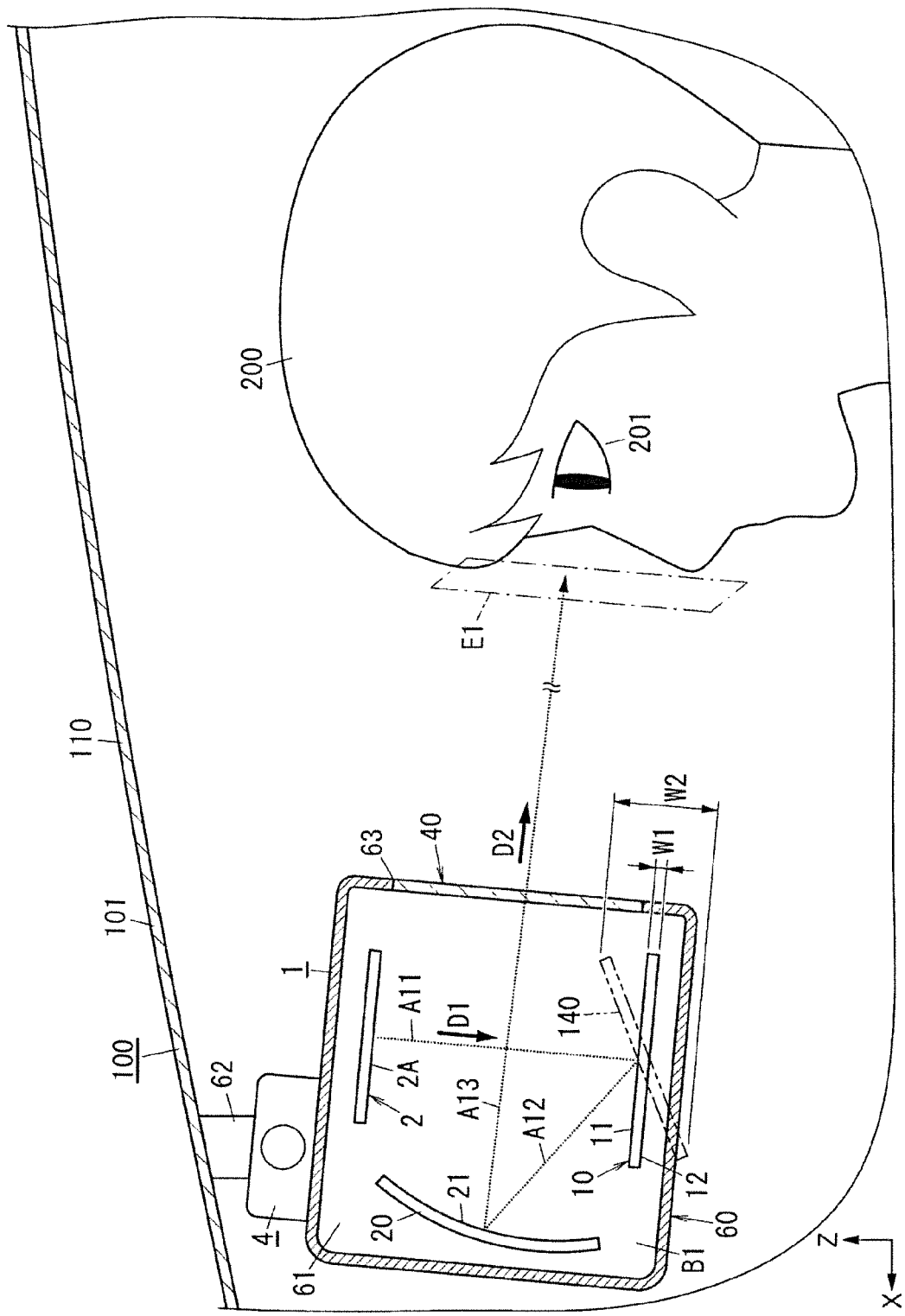
FIG. 1 is a schematic cross-sectional view of an electronic mirror system including a display system according to an embodiment of the present disclosure.

As shown in FIG. 1, display system 1 according to this embodiment includes display device 2, first mirror 10, and second mirror 20. Display device 2 has display surface 2A that displays a first image. Light emitted by display device 2 is directly or indirectly incident on first mirror 10. First mirror 10 reflects the incident light. The light reflected by first mirror 10 is directly or indirectly incident on second mirror 20. Second mirror 20 reflects the incident light toward eye-box E1. The light reflected by second mirror 20 enters eye 201 of observer 200 present within eye-box E1 to display, on eye 201 of observer 200, a second image based on the first image. First mirror 10 is a Fresnel mirror.

The expression that light is "indirectly incident" means here that light is incident through another optical component (e.g., another mirror or lens), for example.

Note that eye-box E1 is a viewpoint area in which a virtual image (i.e., the light reflected by second mirror 20) corresponding to an edge of display surface 2A is invisible to both eyes of observer 200 through second mirror 20 at a predetermined distance from case 60 of display system 1. In FIG. 1, eye-box E1 is at the predetermined distance from case 60 on a plane perpendicular to emitting direction D2 of light path A13. This also applies to FIGS. 8 to 10 which will be described later.

In FIG. 1, dotted lines represent light paths A11 to A13. The light is emitted from the vicinity of the longitudinal and transverse centers of display surface 2A of display device 2, reflected by first mirror 10 and second mirror 20, and emitted to the outside of case 60. In FIG. 1 or other figures, the lines indicating light paths A11 to A13 are shown for illustrative only and are not displayed actually.

First mirror 10 reflects the light emitted from display device 2 toward second mirror 20. Thus, if first mirror 10 is plane mirror 140, as indicated by an imaginary line in FIG. 1, plane mirror 140 needs to be inclined with respect to incident direction D1 (i.e., the direction along light path A11) of the light from display device 2. Accordingly, the overall size of display device 2 may increase in the direction parallel to incident direction D1. By contrast, in this embodiment, being a Fresnel mirror, first mirror 10 has a plurality of smaller reflecting surfaces 14 divided from the reflecting surface of plane mirror 140. Accordingly, first mirror 10 has a smaller thickness in the direction parallel to incident direction D1. Therefore, thickness W1 of first mirror 10 is made shorter than distance W2 between both ends of plane mirror 140 in the direction parallel to incident direction D1 to achieve miniaturized display system 1.

Figure 3:
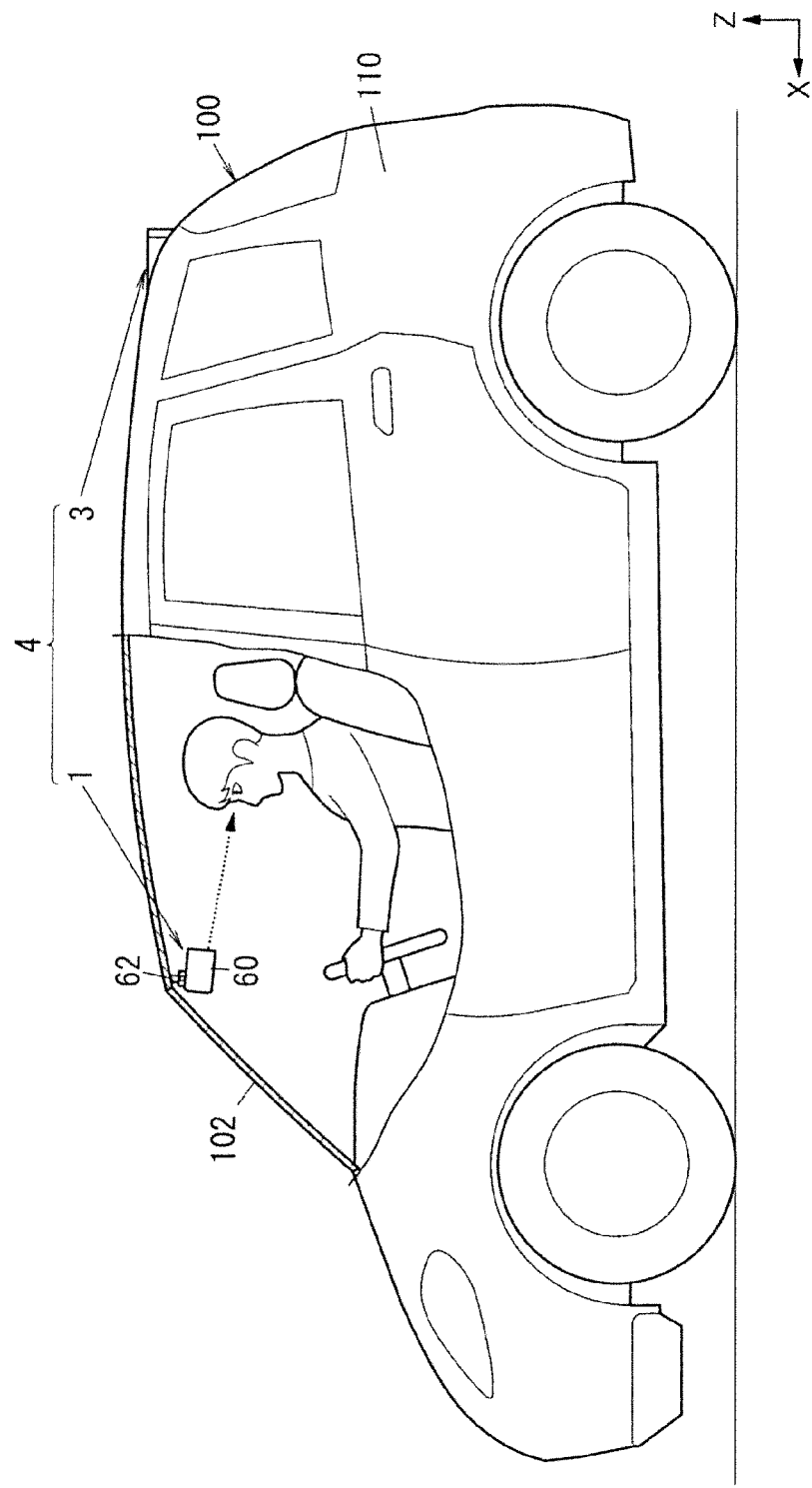
FIG. 3 is a partially broken side view of a moving object equipped with the electronic mirror system.

As shown in FIG. 3, electronic mirror system 4 according to this embodiment includes display system 1 described above, and camera 3 that is mounted in moving object 100 and images the area behind moving object 100. Display device 2 displays, on display surface 2A, the first image based on an image captured by camera 3. Note that the "area behind" moving object 100 may be the area viewed behind from the transverse center of moving object body 110 in the direction, that is, an area visible by a room mirror. Alternatively, the "area behind" may be the area viewed behind from a side of moving object body 110, that is, an area visible a side mirror. In addition, the "area behind moving object 100" may include both the area viewed behind from the transverse center of moving object body 110 and the area viewed behind from a side of moving object body 110.

As described above, display system 1 includes first mirror 10 that is a Fresnel mirror and is thus miniaturized as a whole. As a result, electronic mirror system 4 including miniaturized display system 1 is achieved.

(2) Details
(2.1) Configuration

Figure 4:
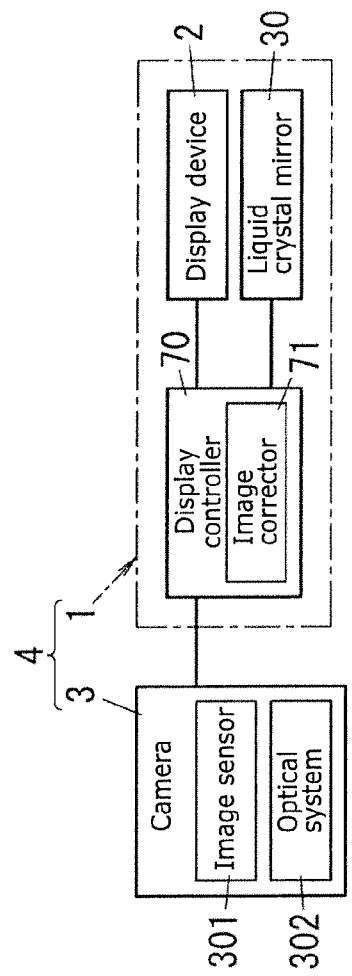
FIG. 4 is a schematic block diagram of the electronic mirror system.

As described above, display system 1 according to this embodiment includes display device 2, first mirror 10, and second mirror 20. In addition, display system 1 further includes liquid crystal mirror 40 and case 60. Display system 1 further includes display controller 70 (see FIG. 4) that controls the display mode of display device 2.

Electronic mirror system 4 according to this embodiment includes display system 1 and camera 3 (see FIG. 3). That is, display system 1 according to this embodiment is used for electronic mirror system 4. Note that electronic mirror system 4 according to this embodiment is mounted in moving object body 110 of moving object 100 such as a motor vehicle. That is, moving object 100 includes electronic mirror system 4 and moving object body 110 equipped with electronic mirror system 4.

Now, configurations of the components of display system 1 and electronic mirror system 4 will be described in detail with reference to FIGS. 1 to 7B.

Case 60 of display system 1 is a molded product made of a synthetic resin, for example. Case 60 is in the shape of a cuboid with housing chamber 61 inside. With case 60 attached to moving object body 110, moving object body 110 has that a transverse length (i.e., the length along the width of the vehicle) that is longer than the vertical and longitudinal lengths. Housing chamber 61 of case 60 houses display device 2, first mirror 10, second mirror 20, and liquid crystal mirror 40. Although not shown in FIG. 1, for example, case 60 further houses display controller 70.

Case 60 is attached to the front of ceiling 101 of moving object body 110 near windshield (i.e., front window) 102 so as to be visible to observer 200 seated on a front seat (see FIG. 1). Case 60 is attached to ceiling 101 while hanging from ceiling 101 of moving object body 110 via support member 62 such as a ball joint, not to block the front view of observer 200. Support member 62 includes an adjustment mechanism (e.g. a ball joint) for adjusting the orientation of case 60. While being located above case 60 and hanging from ceiling 101 in FIGS. 1 and 2, support member 62 may be located at the rear of case 60 (i.e., at the vehicle front) and attached to windshield 102.

Case 60 has, in the rear wall, through-hole 63. Through-hole 63 may be in such a size that liquid crystal mirror 40 is attachable thereto. Through-hole 63 has a transverse length (i.e., the length in the direction orthogonal to the vertical and longitudinal directions) that is longer than the vertical length. The ratio of the transverse length (i.e., the long side length) to the vertical length (i.e., the short side length) falls within a range from about 3:1 to about 6:1.

Display device 2 is housed in an upper region of housing chamber 61. Display device 2 has display surface 2A that displays the first image. Display device 2 is housed in housing chamber 61 with display surface 2A facing downward. Display device 2 outputs, from display surface 2A, light for forming the first image. Display device 2 includes, for example, a light source device and a liquid crystal display (LCD) panel. The LCD panel is located at the front of the light source device. The light source device is used as the backlight of the LCD panel. The light source device is what is called a "surface light source". The light source device is of a side-light type using a solid-state light-emitter such as a light-emitting diode or a laser diode. The light from the light source device is transmitted by the LCD panel and output from display surface 2A of display device 2. The light output from display surface 2A of display device 2 forms the first image. In this embodiment, display device 2 emits, from display surface 2A, the light for forming the first image in the direction orthogonal to display surface 2A. The "direction orthogonal to" a certain plane/surface means here not only the direction intersecting the certain plane/surface strictly at the angle of 90 degrees. The direction may include deviations of some degrees from the direction orthogonal to the certain plane/surface, if the deviated directions seem "orthogonal" for human eyes.

Display system 1 according to this embodiment includes first mirror 10 and second mirror 20 as two or more reflecting members that reflect the light emitted from display surface 2A of display device 2. Specifically, display system 1 has catoptric system B1 composed of first mirror 10 and second mirror 20.

Figure 2:
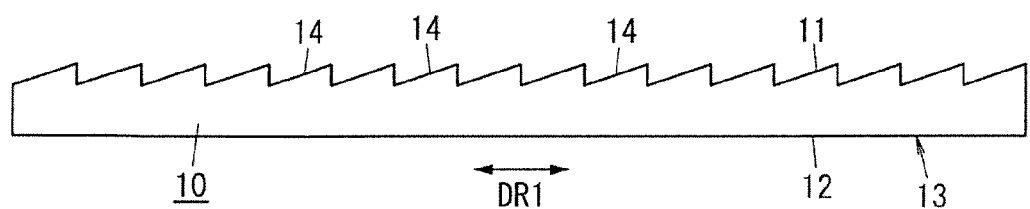
FIG. 2 is a side view of a first mirror included in the electronic mirror system.

As shown in FIG. 2, first mirror 10 includes a plurality of smaller reflecting surfaces 14, each in a strip shape, aligned on the surface (i.e., first surface 11) facing display device 2. Each of smaller reflecting surfaces 14 reflects the light incident from the first direction (i.e., the direction parallel to light path A11), into the second direction. The second direction (i.e., the direction parallel to light path A12) obliquely intersects the first direction. As shown in FIG. 1, the first direction is here orthogonal to alignment direction (DR1) of smaller reflecting surfaces 14 but not limited to the orthogonal direction. Smaller reflecting surfaces 14 are, for example, a plurality of partially reflecting surfaces in a group divided from a reflecting surface such as plane mirror 140 and aligned on first surface 11. The surfaces function as a whole as a single reflecting surface. This first mirror 10 is housed in a lower region of housing chamber 61 with first surface 11, which includes smaller reflecting surfaces 14, facing upward and facing display surface 2A of display device 2. The term "facing" here not only means that two planes/surfaces or components are located in parallel to each other. The term may also include that two planes/surfaces or components are located not parallel to each other, that is, one of the planes/surfaces or components is inclined with respect to the other. Alignment direction DR1 of smaller reflecting surfaces 14 is, on substrate 13, parallel to second surface 12 and opposite to first surface 11.

Smaller reflecting surfaces 14 are here in the following shape. A reflecting surface (i.e., the reflecting surface of plane mirror 140) inclined with respect to second surface 12 is divided into a plurality of surfaces each in the strip shape. The divided surfaces are aligned on first surface 11. If case 60 houses, inside, plane mirror 140 described above, the reflecting surface of plane mirror 140 is inclined with respect to incident direction D1 of the light. There is thus longer distance W2 between both the ends of plane mirror 140 in the direction parallel to incident direction D1 of the light. By contrast, in this embodiment, first mirror 10 is the Fresnel mirror. Thus, thickness W1 of first mirror 10 in the direction parallel to incident direction D1 of the light can be shorter than distance W2 between both the ends of plane mirror 140. As a result, miniaturized display system 1 and electronic mirror system 4 can be achieved.

While being in the shape obtained by dividing plane mirror 140 into the plurality, smaller reflecting surfaces 14 may be in the shape obtained by dividing a concave mirror or a convex mirror into a plurality. That is, first mirror 10 may magnify or reduce and reflect the first image displayed on display surface 2A. The shapes or other characteristics of smaller reflecting surfaces 14 of first mirror 10 and reflecting surface 21 of second mirror 20 is here determined in one preferred embodiment so that both first mirror 10 and second mirror 20 constituting catoptric system B1 magnify the first image displayed on display surface 2A of display device 2.

In this embodiment, the light emitted by display device 2 is reflected by first mirror 10 and second mirror 20. The light reflected by second mirror 20 is incident on liquid crystal mirror 40, whereas the light transmitted by liquid crystal mirror 40 enters eye-box E1. In this embodiment, liquid crystal mirror 40 merely transmits the light reflected by second mirror 20 to the outside of case 60. Liquid crystal mirror 40 is thus held in case 60 so as to be orthogonal to emitting direction D2 (i.e., the direction parallel to light path A13) in which the light reflected by second mirror 20 is emitted to the outside. As a result, as compared to the case where liquid crystal mirror 40 is inclined with respect to emitting direction D2, display system 1 and electronic mirror system 4 can be miniaturized in emitting direction D2.

Second mirror 20 is a concave mirror, for example. Second mirror 20 is housed in a front region of housing chamber 61 with reflecting surface 21 facing rearward. In other words, second mirror 20 is located inside housing chamber 61 to face the inner surface of liquid crystal mirror 40. Reflecting surface 21 of second mirror 20 is obtained, for example, by depositing a metal reflective film made of aluminum, for example, on a surface of a glass. Note that second mirror 20 is not limited to the concave mirror but may be a plane mirror.

Liquid crystal mirror 40 is an optical element obtained by encapsulating liquid crystal between a reflective polarizer and a transmissive polarizer. When a voltage is applied to liquid crystal mirror 40, the mirror is switched to be transmissive. On the other hand, when the voltage is turned off, the mirror is switched to be reflective. Liquid crystal mirror 40 is attached to case 60 so as to close through-hole 63 of case 60. Liquid crystal mirror 40 serves here as a polarizing member on light path A13 of the light reflected by second mirror 20 reaching eye-box E1. Liquid crystal mirror 40 is switchable between the reflective mode and the transmissive mode in accordance with a switching signal input from display controller 70. Since through-hole 63 of case 60 is here closed by liquid crystal mirror 40, less dust, dirt, or any other substance enters housing chamber 61 from the outside. While liquid crystal mirror 40 is attached to through-hole 63 of case 60 in this embodiment, a dust cover transmissive to visible light may be attached to through-hole 63 instead of liquid crystal mirror 40. The observer views the second image displayed on second mirror 20 through the dust cover attached to through-hole 63.

Camera 3 is, for example, attached to the rear of moving object 100 such as a motor vehicle to capture an image behind moving object 100. Camera 3 includes image sensor 301, and optical system 302 that collects the light from an area to be imaged (i.e., the area behind moving object 100) into image sensor 301. Image sensor 301 is, for example, a complementary metal-oxide semiconductor (CMOS) image sensor but may be an image sensor such as a charge-coupled device (CCD) image sensor.

Camera 3 outputs image data on the captured image of the area behind moving object 100 such as a motor vehicle, for example, via an in-vehicle network to display controller 70. Camera 3 is located at the transverse center of the rear of moving object 100 such as a motor vehicle to image the range visible with a conventional room mirror. Electronic mirror system 4 is used as a rearview mirror such as the conventional room mirror. Since camera 3 is attached to the rear of moving object 100, an image captured by camera 3 include neither rear seats nor pillars, for example. Note that camera 3 may image the area behind and at a side of moving object 100 such as a motor vehicle. Camera 3 may image the range visible with a conventional door or fender mirror. Electronic mirror system 4 may be used as a rearview mirror instead of the conventional door or fender mirror. Camera 3 is attached to the rear of moving object body 110 and the upper region of moving object body 110. The attachment position of camera 3 is an example and camera 3 may be attached to a position in which a desired range can be imaged.

Display controller 70 causes display surface 2A of display device 2 to display the first image based on the image captured by camera 3. Display controller 70 establishes communications (e.g., wired or wireless communications) with camera 3 via an in-vehicle network of moving object (or motor vehicle) 100, for example. The image data on the image behind moving object body 110 captured by camera 3 is input to display controller 70. Display controller 70 causes display surface 2A of display device 2 to display the first image based on the image captured by camera 3.

The "first image based on the image captured by camera 3" may include here not only the image itself captured by camera 3 but also an image obtained by performing predetermined correction on the image captured by camera 3. In this embodiment, display controller 70 includes image corrector 71 that corrects the first image to be displayed on display surface 2A of display device 2. Image corrector 71 performs, for example, image processing of correcting distortion of the first image to be displayed on display surface 2A so as to reduce distortions of second image G2 to be viewed by observer 200.

In display system 1 according to this embodiment, the Fresnel mirror is used as first mirror 10, and display device 2 is located in parallel to first mirror 10. There is thus a larger difference in the optical path length to second mirror 20 between the front and rear ends of display device 2. As a result, trapezoidal distortions occur in second image G2 to be viewed by observer 200. In the trapezoidal distortion, the upper part of second image G2 is more expanded in the transverse direction than the lower part. Therefore, image corrector 71 corrects the first image to be displayed on display surface 2A so as to display an image obtained by reducing the trapezoidal distortions of second image G2. Note that image corrector 71 may not only perform the distortion correction for reducing the trapezoidal distortions of second image G2 but also the brightness correction, for example, of the image captured by camera 3. For example, since the image captured by camera 3 is dark in the night, image corrector 71 may correct the brightness of the image captured by camera 3.

Display controller 70 may create, based on the image captured by camera 3, a CG image or a maker, for example, indicating an obstacle or any other object included in the image. The display controller may then cause display surface 2A of display device 2 to display an image obtained by superimposing the CG image or the maker, for example, onto the image captured by camera 3. Alternatively, the display controller may cause display surface 2A of display device 2 to display the first image obtained by superimposing a maker indicating driving assistance information on the image captured by camera 3. The driving assistance information may include, for example, vehicle speed information, navigation information, pedestrian information, preceding vehicle information, lane departure information, and vehicle condition information.

In display system 1 according to this embodiment, the first image displayed by display device 2, that is, the light emitted from display surface 2A of display device 2 is reflected a plurality of times (e.g., twice in this embodiment), namely by first mirror 10 and second mirror 20. The apparent distance (i.e., the visual range) from eye 201 (i.e., the point of view) of observer 200 to an object included in second image G2 is here determined by the optical path length from display surface 2A of display device 2 to second mirror 20 and the focal length of catoptric system B1, for example. In this embodiment, the light emitted from display surface 2A of display device 2 is reflected twice to reduce the size of case 60 (or housing chamber 61) while maintaining the visual range of the object included in second image G2 at a desired distance. As a result, case 60 can be miniaturized in the direction (i.e., the direction parallel to light path A13) in which observer 200 views second mirror 20 through liquid crystal mirror 40.

(2.2) Operation

An operation of electronic mirror system 4 including display system 1 according to this embodiment will be described.

For example, once electric power is supplied from the battery of moving object 100 to electronic mirror system 4 and a start-up instruction is input from an electronic control unit (ECU) included in moving object 100 to electronic mirror system 4, electronic mirror system 4 starts operating.

At this time, display controller 70 starts up camera 3, causes camera 3 to image the area behind moving object 100 at a predetermined frame rate, and obtains image data from camera 3. Upon obtention of the image data from camera 3, display controller 70 causes display surface 2A of display device 2 to display the first image based on this image data. While causing display surface 2A of display device 2 to display the first image, display controller 70 brings liquid crystal mirror 40 into the transmissive mode.

At this time, the light emitted from display surface 2A of display device 2 is reflected by first mirror 10 and second mirror 20, is then transmitted by liquid crystal mirror 40, and enters eye-box E1 of observer 200. The light reflected by second mirror 20 enters eye 201 of observer 200, whereby second image G2 obtained by magnifying the first image displayed on display surface 2A of display device 2 is viewed by observer 200.

When not causing display surface 2A of display device 2 to display the first image, display controller 70 brings liquid crystal mirror 40 into the reflective mode. Liquid crystal mirror 40 is thus utilized as a typical outside light-reflecting mirror. When no electric power is supplied from the battery of moving object 100 to electronic mirror system 4, liquid crystal mirror 40 is switched from the transmissive mode to the reflective mode. When liquid crystal mirror 40 is here in the reflective mode, observer 200 views the area behind moving object body 110 using liquid crystal mirror 40 in the reflective mode. Liquid crystal mirror 40 is utilized as a typical mirror.

Figure 6:
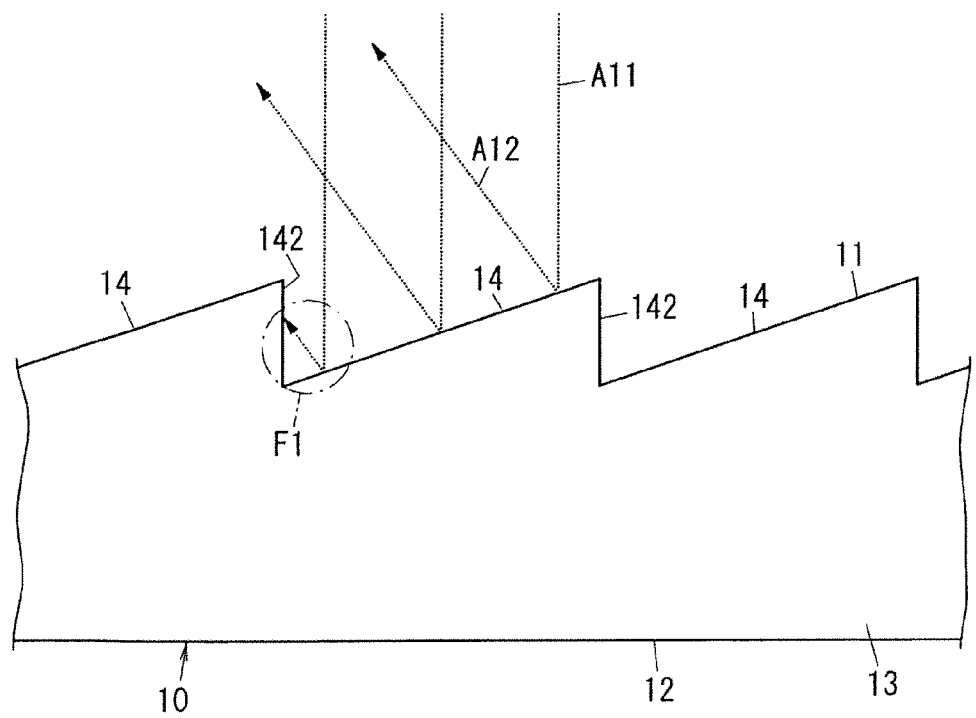
FIG. 6 is a partially enlarged side view of an example of the first mirror included in the electronic mirror system.

The plurality of smaller reflecting surfaces 14 are aligned on first surface 11 of first mirror 10. Thus, as shown in FIG. 6, a part of reflected light may be vignetted by steps 142 (the light at F1 of FIG. 6) between adjacent pairs of smaller reflecting surfaces 14. The alignment direction (i.e., the transverse direction in FIG. 6) of smaller reflecting surfaces 14 here corresponds to the vertical direction of second image G2 viewed by observer 200. When the part of reflected light is shielded by steps 142, the light reflected by first mirror 10 is shielded in the vertical direction of second image G2 by the length corresponding to the length of steps 142. As a result, second image G2 may seem to be compressed in the vertical direction. That is, second image G2 may have an aspect ratio with a smaller vertical size than in the actual aspect ratio.

Figure 7A:
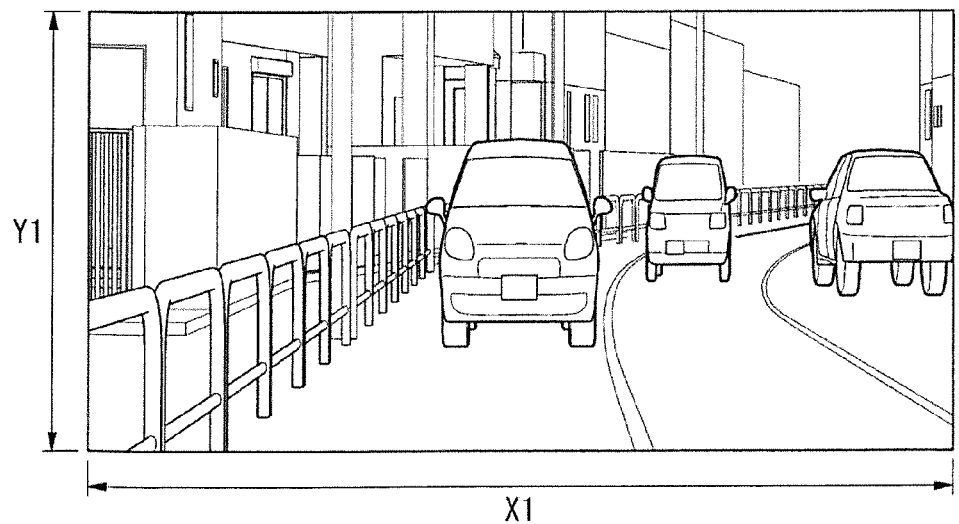
FIG. 7A is an illustration of a first image displayed on a display device included in the electronic mirror system.
Figure 7B:
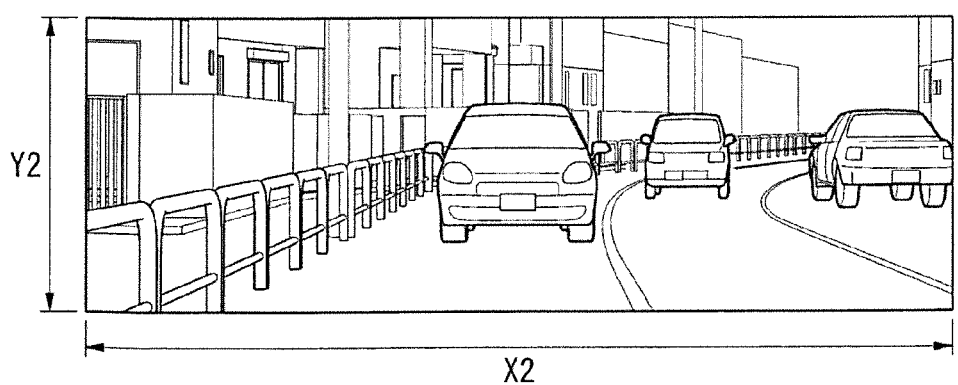
FIG. 7B is an illustration of a second image displayed by the electronic mirror system.

To address the problem, display system 1 according to this embodiment, image corrector 71 adjusts the aspect ratio of the image captured by camera 3 to correct block-up of second image G2 in the vertical direction caused by the light vignetted at steps 142 of the Fresnel mirror. As shown in FIG. 7A, image corrector 71 performs image processing of correcting the image captured by camera 3 into an aspect ratio (X1:Y1) with vertical size Y1 larger than before the correction. The image corrector causes display surface 2A of display device 2 to display first image G1 after the image processing. The light emitted from display surface 2A of display device 2 is incident on first mirror 10 and reflected by smaller reflecting surfaces 14 of first mirror 10 toward second mirror 20. A part of the reflected light is however shielded by steps 142 of smaller reflecting surfaces 14. However, first image G1 has the corrected aspect ratio (X1:Y1) with larger vertical size Y1. As shown in FIG. 7B, since second image G2 has a lower ratio of vertical size Y2 than first image G1, the aspect ratio (X2:Y2) is adjusted to be closer to the actual aspect ratio. As a result, observer 200 viewing second image G2 feels less discomfort.

Instead of adjusting, using image corrector 71, the aspect ratio of first image G1 to be displayed on display surface 2A of display device 2, optical system 302 of camera 3 may include an anamorphic lens. An anamorphic lens has a larger magnification rate in the vertical direction than in the transverse magnification rate. If optical system 302 of camera 3 includes an anamorphic lens, an image captured by camera 3 seems more expanded in the vertical direction than in the actual image. Accordingly, the aspect ratio of second image G2 viewed by observer 200 is adjusted to be closer to the actual aspect ratio. As a result, observer 200 viewing second image G2 feels less discomfort.

That is, electronic mirror system 4 according to this embodiment further includes the corrector that corrects the aspect ratio of second image G2 viewed by observer 200. The corrector includes at least one of image corrector 71 and the anamorphic lens. Image corrector 71 adjusts the aspect ratio of first image G1 to be displayed on display surface 2A so as to correct the aspect ratio of second image G2. The anamorphic lens included in optical system 302 is mounted in camera 3 and collects the light from the area to be imaged, into image sensor 301 of camera 3. The anamorphic lens has different magnification rates in the vertical direction and the transverse direction of an image captured by camera 3. In this manner, the corrector including at least one of the anamorphic lens included in optical system 302 and image corrector 71 adjusts the aspect ratio of second image G2. Accordingly, the aspect ratio of second image G2 is corrected to be closer to the actual aspect ratio. As a result, observer 200 viewing second image G2 feels less discomfort.

Note that image corrector 71 may further perform image processing of correcting distortion of first image G1 so as to reduce the distortions of second image G2. For example, assume that trapezoidal distortions of second image G2 occur such that the upper part of second image G2 is largely expanded in the transverse direction than the lower part. In this case, image corrector 71 may perform the distortion correction in advance so that the upper part of first image G1 is more expanded in the transverse direction than the lower part of first image G1. As a result, the trapezoidal distortions of second image G2 can be reduced.

Second mirror 20 may have here different magnification/reduction rates in the vertical direction and the transverse direction of second image G2. Second mirror 20 magnifies or reduces at a vertical magnification/reduction rate different from a transverse magnification/reduction rate so as to correct the distortions of second image G2 in the vertical direction.

In this embodiment, first mirror 10 is disposed such that steps 142 in FIG. 6 extend in parallel to the direction (i.e., light path A11) of the light incident on first mirror 10. In addition, steps 142 are in a dark color. Specifically, only steps 142 are colored in black. With this configuration, the vignetted part (the light at F1 in FIG. 6) of reflected light is reflected by steps 142 to become stray light inside housing chamber 61, which reduces possible degradations in the quality of second image G2.

Note that the "dark color" is a color with reflectivity characteristics that absorb the light at F1 in FIG. 6 so that the influence of the stray light on the quality of second image G2 is invisible. The color is thus not limited to black.

Figure 8:
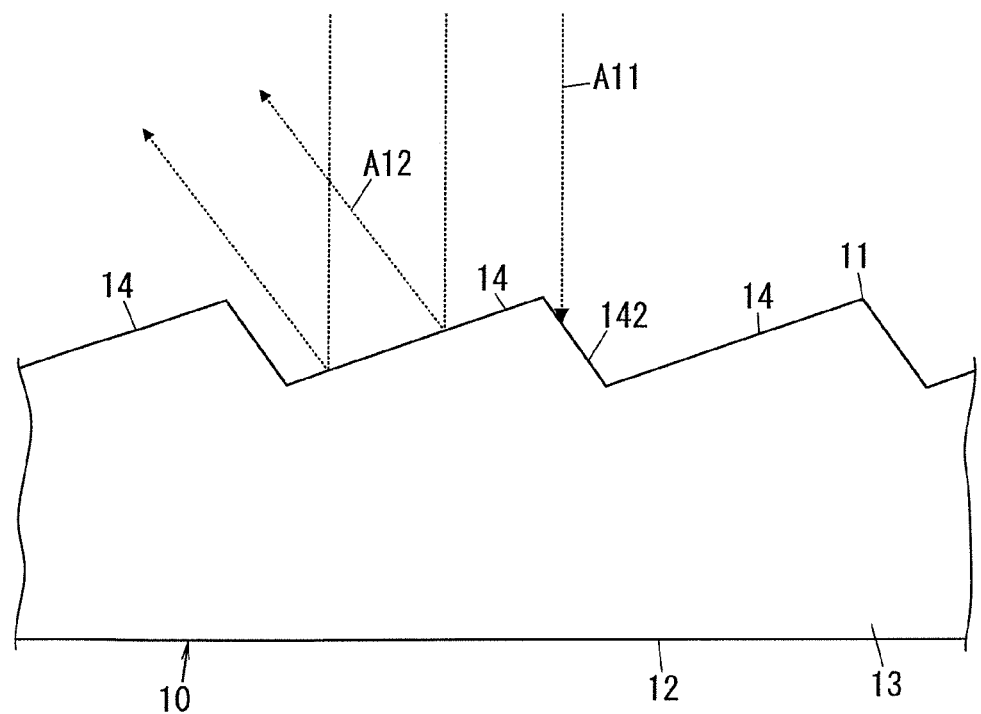
FIG. 8 is a partially enlarged side view of another example of the first mirror included in the electronic mirror system.

Steps 142 do not necessarily extend in parallel to the direction (i.e., light path A11) of the light incident on first mirror 10 like in first mirror 10 shown in FIG. 6 and may have the configuration shown in FIG. 8. As shown in FIG. 8, steps 142 may extend in parallel to the direction (i.e., light path A12) of the light reflected by first mirror 10. Steps 142 are in a dark color (e.g., black). This configuration reduces the vignette of the part of the reflected light described with reference to FIG. 6. However, the part of the light incident on first mirror 10 is absorbed by steps 142 (see, light path A11), which also reduces the stray light at first mirror 10 in FIG. 8. However, like first mirror 10 in FIG. 6, the light reflected by first mirror 10 is shielded in the vertical direction of second image G2 by the length corresponding to the length of steps 142. As a result, second image G2 may seem to be compressed in the vertical direction. Thus, in first mirror 10 of FIG. 8 as well, as described with reference to FIGS. 7A and 7B, image corrector 71 may adjust the aspect ratio of the image captured by camera 3. This is to correct the block-up of second image G2 in the vertical direction caused by the vignetted light at steps 142 of the Fresnel mirror.

To summarize the configurations in FIGS. 6 and 8, first mirror 10 is disposed such that steps 142 between adjacent smaller reflecting surfaces 14 extend in parallel to the direction of the light incident on first mirror 10 or the direction of the light reflected by first mirror 10. Step 142 are in a dark color. If steps 142 extend here not in parallel to the direction of the light incident on first mirror 10 or the direction of the light reflected by first mirror 10, both the part of the light (see light path A11) incident on first mirror 10 and the part of the light (see light path A12) reflected by first mirror 10 are vignetted at steps 142. As a result, the simple image correction of the aspect ratio as described with reference to FIGS. 7A and 7B cannot be performed. Therefore, steps 142 are desired to extend in parallel to the direction of the light incident on first mirror 10 or the direction of the light reflected by first mirror 10.

In this embodiment, as shown in FIG. 1, display device 2 is located in an upper region of housing chamber 61, whereas first mirror 10 is located in a lower region of housing chamber 61. The vertical positions of display device 2 and first mirror 10 are interchangeable.

(3) Variations

The embodiment described above is a mere example of various embodiments of the present disclosure. Various modifications may be made to the embodiment described above depending on the design, for example, as long as achieving the objective of the present disclosure.

Display system 1 according to the present disclosure includes a computer system. The computer system includes, as main components, a processor and a memory being hardware. In the computer system, the processor executes programs stored in the memory to fulfill the functions as display system 1 according to the present disclosure (e.g. the functions of display controller 70 or image corrector 71). The programs may be stored in advance in the memory of the computer system and provided through telecommunications lines. Alternatively, the programs may be stored in a non-transitory recording medium, such as a memory card, an optical disk, or a hard disk drive, readable by the computer system and may be then provided. The processor of the computer system includes one or more electronic circuits such as semiconductor integrated circuits (ICs) or large-scale integrated (LSI) circuits. The integrated circuits such as ICs or LSI circuits are here referred to depending on the degree of integration, and may include integrated circuits such as system LSI circuits, very large scale integrated (VLSI) circuits or ultra large scale integrated (ULSI) circuits. In addition, a field programmable gate array (FPGA) programmed after the manufacture of an LSI circuit or be a logic device capable of reconfiguring the connections or circuit divisions inside an LSI may be employed as the processor. The plurality of electronic circuits may be integrated into a single chip or distributed into a plurality of chips. The plurality of chips may be integrated into a single device or may be distributed into a plurality of devices. The computer system includes here a microcontroller including one or more processors and one or more memories. Thus, the microcontroller also includes one or more electronic circuits such as semiconductor integrated circuits or large-scale integrated circuits.

(3.1) Variation 1

Figure 9:
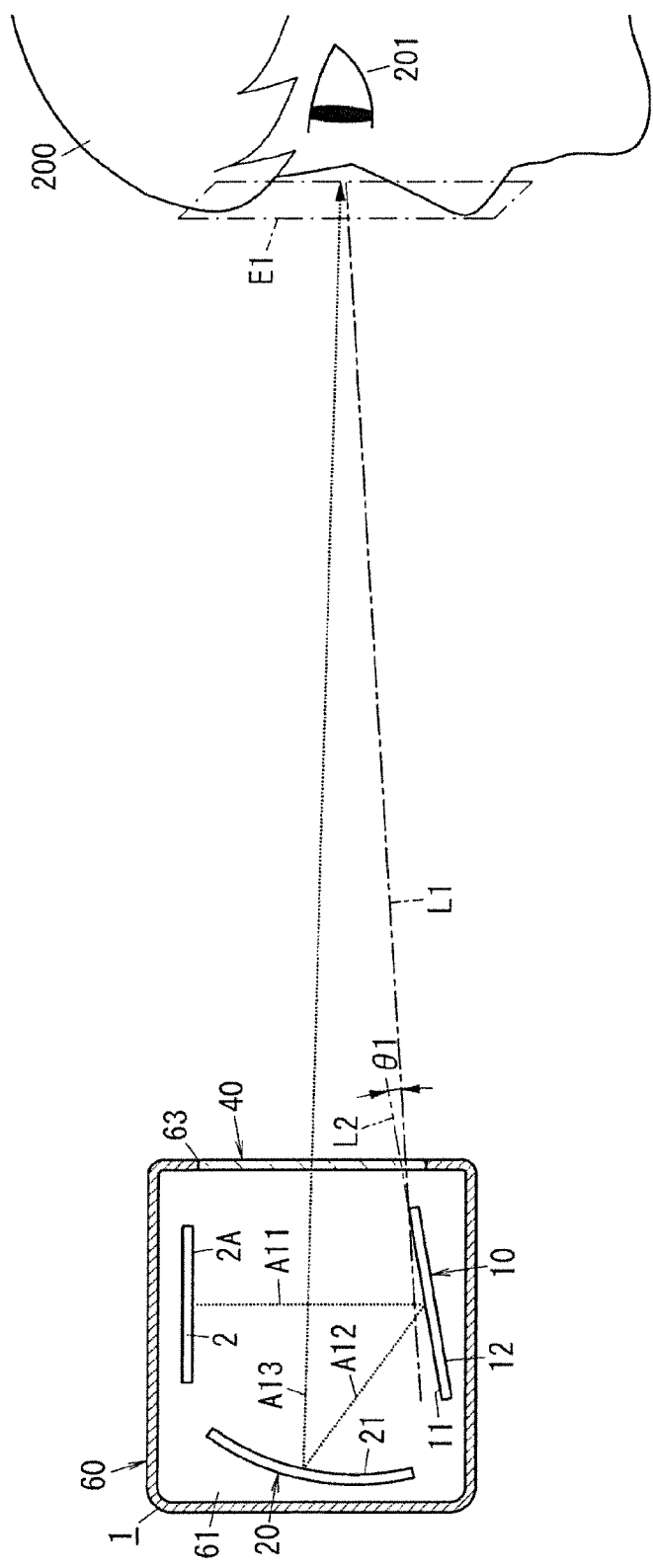
FIG. 9 is a schematic cross-sectional view of an electronic mirror system according to Variation 1.

As shown in FIG. 9, in display system 1 according to Variation 1, first mirror 10 is inclined so that first surface 11 is invisible from eye 201 of observer 200 within eye-box E1. In this respect, this variation is different from the embodiment described above. Specifically, first mirror 10 is located as follows. The observation direction (i.e., the direction along line L1) of eye 201 of observer 200 intersects the direction in which line L2 along first surface 11 of first mirror 10 extends, at predetermined angle θ1 that is greater than zero. Other than the arrangement of first mirror 10, the variation is the same or similar to the embodiment described above. The same reference characters are used to represent constituent elements that are common to display system 1 according to the embodiment described above, and the detailed explanation thereof will be omitted.

First mirror 10 is located inside housing chamber 61 so that first surface 11 is invisible from eye 201 of observer 200 within eye-box E1. This arrangement reduces the possibility that the light incident on second mirror 20 from the rear of case 60 is reflected by second mirror 20 and first mirror 10 and enters eye 201 of observer 200.

Figure 10:
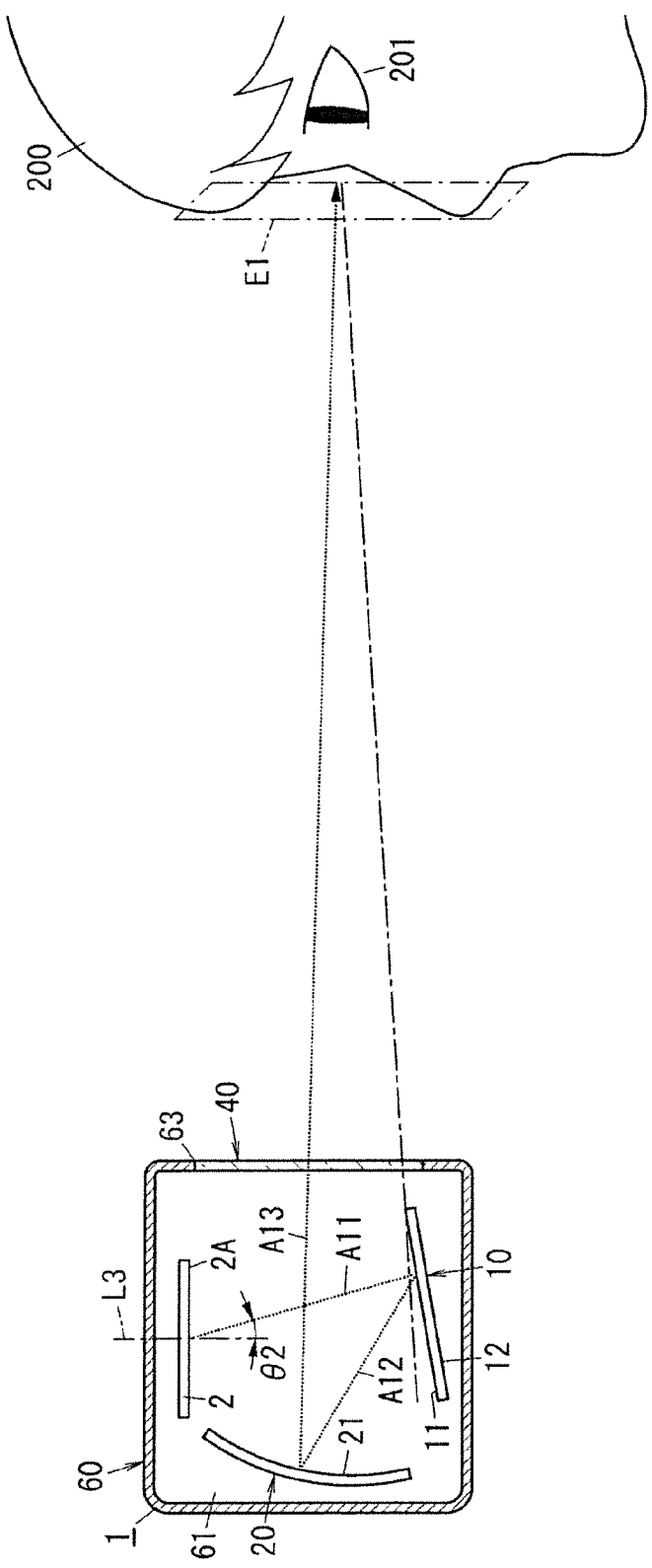
FIG. 10 is a schematic cross-sectional view showing an example arrangement in which the display device is inclined in the electronic mirror system.

As shown in FIG. 10, in electronic mirror system 4 according to Variation 1, display device 2 may emit light in the emitting direction (i.e., the direction parallel to light path A11) intersecting the normal direction (i.e., the direction parallel to line L3) of display surface 2A at predetermined angle θ2.

Display device 2 includes, for example, an LCD panel and a light source device used as the backlight of the LCD panel. The emitting direction of the light from the light source device is here inclined with respect to the normal direction of display surface 2A by a prism, for example, included in the light source device. Accordingly, the emitting direction of the light from display device 2 is inclined with respect to the normal direction of display surface 2A.

In this manner, the inclination of first mirror 10 reduces the difference between the following optical path lengths. One extends from the rear end of display surface 2A through first mirror 10 to the upper end of second mirror 20. The other extends from the front end of display surface 2A through first mirror 10 to the lower end of second mirror 20. Accordingly, the difference in the optical path length between the upper and lower parts of second image G2 formed on reflecting surface 21 of second mirror 20 decreases, which reduces the trapezoidal distortions of second image G2.

In display system 1 shown in FIG. 10 as well, first mirror 10 is inclined so that first surface 11 is invisible from eye 201 of observer 200 within eye-box E1. This arrangement recues the possibility that unnecessary outside light is viewed by eye 201 of observer 200.

Figure 11:
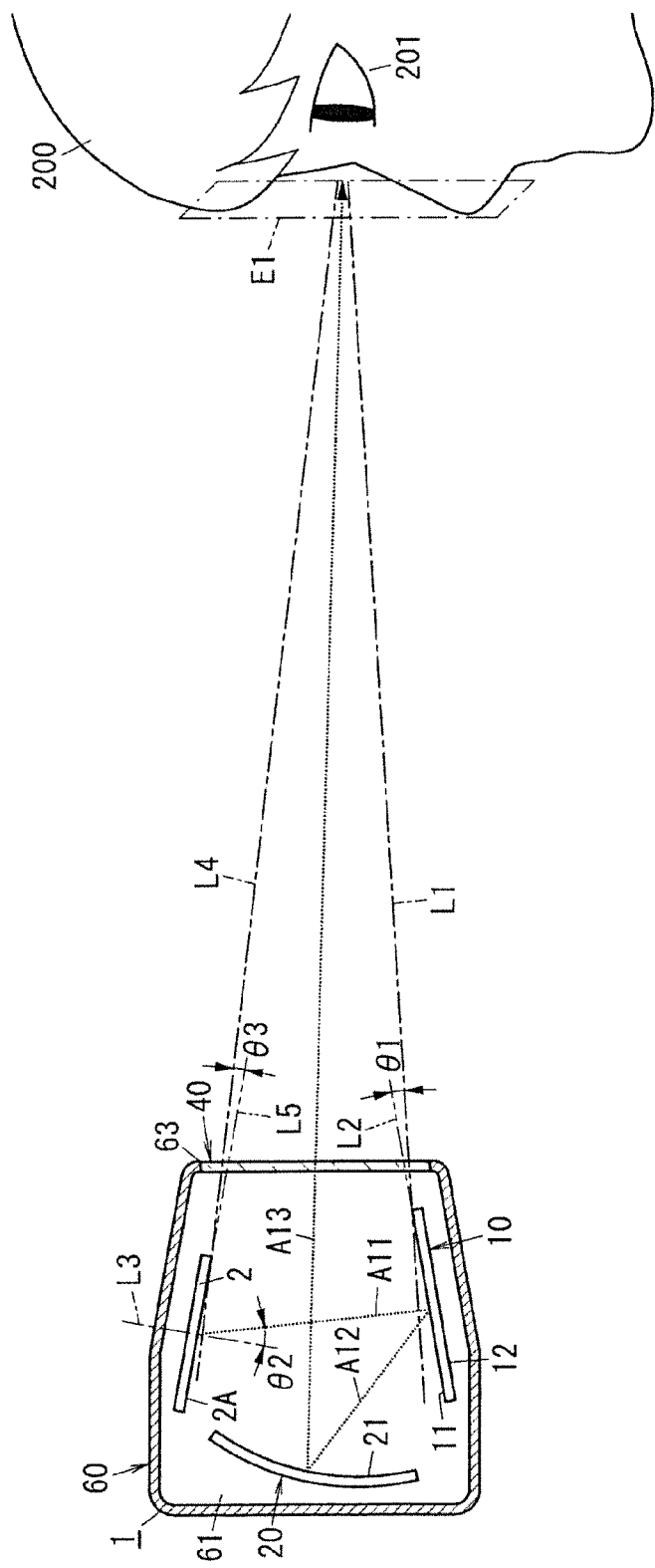
FIG. 11 is a schematic cross-sectional view showing an example arrangement in which the display device and the first mirror are inclined in the electronic mirror system.

In display system 1 shown in FIG. 10, as shown in FIG. 11, display surface 2A of display device 2 may be inclined with respect to the observation direction of eye 201 of observer 200 so as not to be visible from eye 201 of observer 200 within eye-box E1. Specifically, display device 2 may be located so that the observation direction (i.e., the direction along line L4) of eye 201 of observer 200 intersects the direction in which line L5 along display surface 2A of display device 2 extends, at predetermined angle θ3 that is greater than zero. This arrangement of display device 2 reduces the possibility that eye 201 of observer 200 directly views the first image displayed on display surface 2A of display device 2. In eye-box E1, angles θ1 and θ3 are substantially equal to each other in one preferred embodiment to make display surface 2A and first surface 11 invisible.

As described above, at least one of the surface (i.e., first surface 11) of first mirror 10 facing display device 2 and display surface 2A of display device 2 is also inclined with respect to the observation direction of eye 201 of observer 200 in one preferred embodiment so as not to be visible from eye 201 of observer 200 within eye-box E1. This arrangement reduces the possible that an unnecessary object other than second image G2 is viewed by eye 201 of observer 200.

As shown in FIG. 9, in this variation, display device 2 is located in an upper region of housing chamber 61, whereas first mirror 10 is located in a lower region of housing chamber 61. The vertical positions of display device 2 and first mirror 10 are interchangeable.

(3.2) Variation 2

Figure 12:
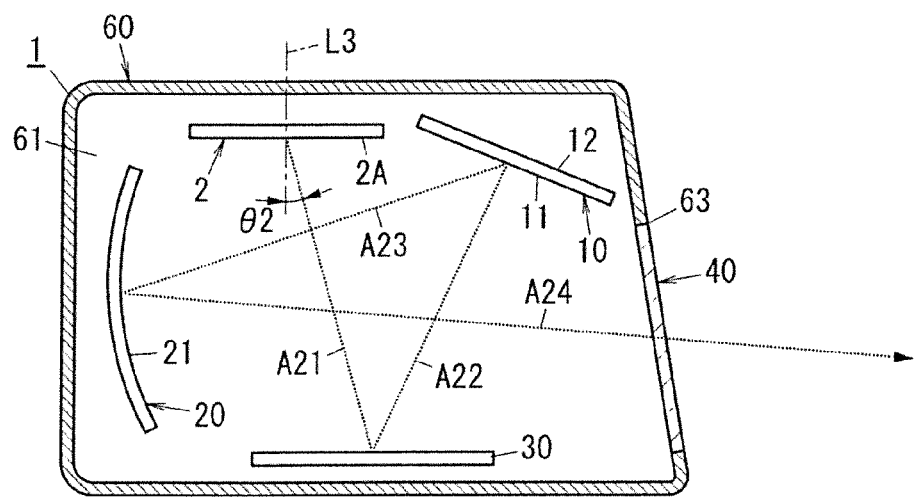
FIG. 12 is a schematic cross-sectional view of an electronic mirror system according to Variation 2.

As shown in FIG. 12, display system 1 according to Variation 2 further includes third mirror 30 on which the light emitted by display device 2 is directly incident and which reflects the incident light toward first mirror 10. First mirror 10 includes a plurality of smaller reflecting surfaces 14, each in a strip shape, aligned on the surface facing third mirror 30. In these respects, the variation is different from the embodiment and Variation 1 described above. Other than third mirror 30, the variation is the same or similar to the embodiment described above. The same reference characters are used to represent constituent elements that are common to display system 1 according to the embodiment described above, and the detailed explanation thereof will be omitted.

With the reflecting surface facing upward, third mirror 30 is located in a lower region of housing chamber 61 to face display surface 2A of display device 2.

With first surface 11 facing downward, first mirror 10 is located in an upper region of housing chamber 61. First mirror 10 is here interposed between display device 2 and liquid crystal mirror 40. First surface 11 of first mirror 10 faces the reflecting surface (i.e., the upper surface) of third mirror 30 and reflecting surface 21 of second mirror 20. The plurality of smaller reflecting surfaces 14 on first surface 11 reflect the light incident from a first direction (i.e., the direction parallel to light path A22 described above), into a second direction (i.e., the direction parallel to light path A23 described above) that obliquely intersects the first direction.

In this display system 1, display device 2 emits light in the direction intersecting normal line L3 of display surface 2A at predetermined angle θ2. Display device 2 adjusts, for example, the direction in which the light source device, which is the backlight of the LCD panel, emits light, using a prism included in the light source device to adjust the emitting direction of the light from display device 2.

The light emitted from display surface 2A of display device 2 is incident on third mirror 30 and the light reflected by third mirror 30 is incident on first mirror 10. First mirror 10 reflects the light incident from third mirror 30 toward second mirror 20. The light reflected by second mirror 20 is transmitted by liquid crystal mirror 40 and emitted to the outside of case 60. In FIG. 12, dotted lines represent light paths A21 to A24. The light is emitted from the vicinity of the center of display surface 2A of display device 2 is reflected by first mirror 10, third mirror 30, and second mirror 20, then transmitted by liquid crystal mirror 40, and emitted to the outside of case 60. In FIG. 12, the lines indicating light paths A21 to A24 are shown for illustrative only and are not displayed actually.

The light emitted from display device 2 is reflected three times, namely by third mirror 30, first mirror 10, and second mirror 20, and then emitted outside through liquid crystal mirror 40. Since a configuration with a longer visual range requires a longer optical path length, display system 1 according to Variation 2 has miniaturized case 60 at the same optical path length as in the configurations of FIGS. 1, 9, 10 and 11. As a result, miniaturized display system 1 and electronic mirror system 4 can be achieved.

First mirror 10 being a Fresnel mirror causes trapezoidal distortions of second image G2. Such the trapezoidal distortions of second image G2 can be reduced by display device 2 emitting light obliquely with respect to display surface 2A. Specifically, display device 2 emit light obliquely with respect to display surface 2A. In this configuration, the trapezoidal distortions of second image G2 and trapezoidal distortions of second image G2, in the opposite direction, caused by first mirror 10, which is the Fresnel mirror, reflecting light cancel each other. As a result, the trapezoidal distortions of second image G2 can be reduced.

Note that the reflecting surface of third mirror 30 is not limited to a plane and may be a free-form surface (e.g., a concave surface or a convex surface).

The outer surface of liquid crystal mirror 40 is inclined with respect to the observation direction (i.e., the direction parallel to light path A24) of the observer so that the normal line of the outer surface of liquid crystal mirror 40 extends upward. In this manner, the outer surface of liquid crystal mirror 40 is inclined with respect to the observation direction of the observer. This arrangement reduces outside light, for example, incident on the outer surface of liquid crystal mirror 40 from the back of observer and entering the eye of the observer. As a result, the light from behind less hits the outer surface of liquid crystal mirror 40 decreases.

In this variation, as shown in FIG. 12, display device 2 and first mirror 10 are located in an upper region of housing chamber 61, whereas third mirror 30 is located in a lower region of housing chamber 61. The vertical positions of display device 2 and first mirror 10 are interchangeable with that of third mirror 30. Assume that display device 2 and first mirror 10 are located in a lower region of housing chamber 61, whereas third mirror 30 is located in an upper region of housing chamber 61. In this case, the outer surface of liquid crystal mirror 40 may be inclined with respect to the observation direction of the observer so that the normal line of the outer surface of liquid crystal mirror 40 extends upward.

(3.3) Variation 3

Figure 13:
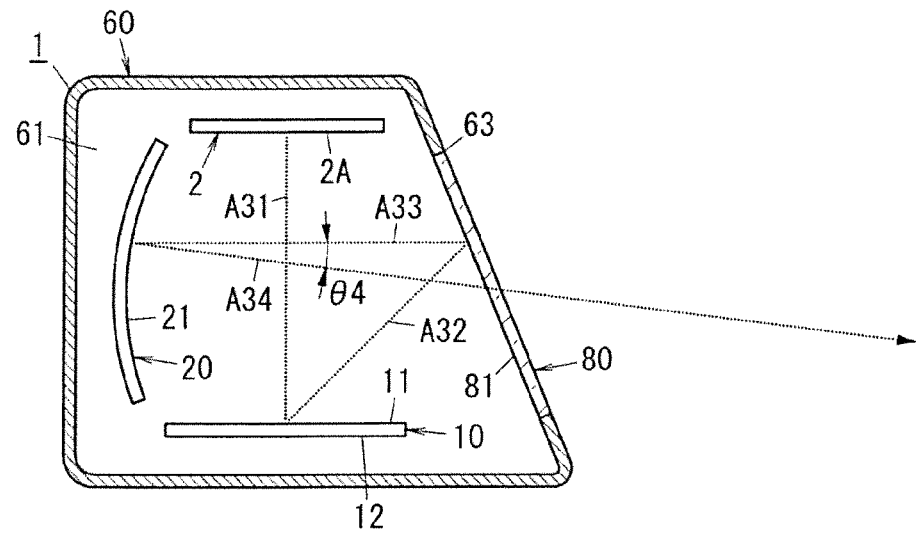
FIG. 13 is a schematic cross-sectional view of an electronic mirror system according to Variation 3.

As shown in FIG. 13, display system 1 according to Variation 3 includes half mirror 80 instead of liquid crystal mirror 40. In this respect, this variation is different from the embodiment described above. Other than half mirror 80, the variation is the same or similar to the embodiment described above. The same reference characters are used to represent constituent elements that are common to display system 1 according to the embodiment described above, and the detailed explanation thereof will be omitted.

The display system according to Variation 3 further includes half mirror 80 on which the light reflected by first mirror 10 is incident. The light reflected by half mirror 80 is incident on second mirror 20. The light reflected by second mirror 20 is transmitted by half mirror 80 and enters eye 201 of observer 200.

Specifically, in Variation 3, the light emitted from display device 2 is reflected three times, namely by first mirror 10, half mirror 80, and second mirror 20, then transmitted by half mirror 80, and emitted to the outside of case 60. In FIG. 13, dotted lines represent light paths A31 to A34. The light emitted from the vicinity of the center of display surface 2A of display device 2 is reflected by first mirror 10, half mirror 80, and second mirror 20, then transmitted by half mirror 80, and emitted to the outside of case 60. In FIG. 13, the lines indicating light paths A31 to A34 are shown for illustrative only and are not displayed actually.

Half mirror 80 is attached to through-hole 63 in the rear wall of case 60. Half mirror 80 is transmissive to visible light. Half mirror 80 functions to transmit a part of incident light and reflect the other part of the incident light. In this variation, half mirror 80 is a beam splitter in the shape of a flat plate with a light-transmittance and a light-reflectivity of about 50%. Half mirror 80 is inclined with respect to the vertical direction so that the upper end of half mirror 80 protrudes more forward than the lower end.

The surface 81 (hereinafter also referred to as an "inner surface") at housing chamber 61, of half mirror 80 faces first surface 11 of first mirror 10 and reflecting surface 21 of second mirror 20.

In this variation, half mirror 80 is located so that the incident direction (i.e., the direction along light path A32) of the light from first mirror 10 and the direction (i.e., the direction along light path A33) of the light reflected toward second mirror 20 obliquely intersect the normal direction of inner surface 81.

First mirror 10 reflects the light emitted from display surface 2A of display device 2 obliquely forward (obliquely upward in FIG. 13). Half mirror 80 reflects the light incident from first mirror 10 toward second mirror 20, and second mirror 20 reflects the light incident from half mirror 80 toward half mirror 80. The light reflected by second mirror 20 is incident on half mirror 80, transmitted by half mirror 80, and emitted to the outside of case 60.

In this manner, in display system 1 according to in Variation 3, the light emitted from display device 2 is reflected three times, namely by first mirror 10, half mirror 80, and second mirror 20, and then emitted to the outside of case 60. Thus, display system 1 according to Variation 3 reflects the light more times than in the embodiment described above. At the substantially same optical path length, case 60 can be miniaturized more than in the embodiment described above.

In display system 1 according to in Variation 3, the direction (i.e., the direction along light path A33) in which the light is incident on second mirror 20 from half mirror 80 intersects the direction (i.e., the direction along light path A34) in which second mirror 20 reflects the light toward half mirror 80, at predetermined angle θ4. In other words, second mirror 20 reflects the light in the direction different from the direction of the light incident from half mirror 80.

Second mirror 20 reflects here the light incident from half mirror 80 in the direction different from the incident direction. The second image displayed on reflecting surface 21 of second mirror 20 can be formed in a shape such that both transverse ends curve slightly upward, as compared to the transverse center. This shape reduces possible trapezoidal distortions of the second image formed on reflecting surface 21 of second mirror 20.

While being a plane in this variation, the inner surface (i.e., the reflecting surface) 81 of half mirror 80 may be a concave surface and functions to magnify an image.

In this variation, half mirror 80 may be a Fresnel mirror that transmits a part of incident light and reflects the other part of the incident light. Case 60 can be then miniaturized in the longitudinal direction.

In this variation, as shown in FIG. 13, display device 2 is located in an upper region of housing chamber 61, whereas first mirror 10 is located in a lower region of housing chamber 6. The vertical positions of display device 2 and first mirror 10 are interchangeable. Assume that display device 2 is located in a lower region of housing chamber 61, whereas first mirror 10 is located in an upper region of housing chamber 61. In this case, the outer surface of liquid crystal mirror 40 only needs to be inclined with respect to the observation direction of the observer so that the normal line of the outer surface of liquid crystal mirror 40 extends upward.

(3.4) Other Variations

In the embodiment and variations described above, second mirror 20 may be a Fresnel mirror with a plurality of reflecting surfaces divided from a concave mirror. Second mirror 20 in the shape of a plate allows miniaturization of case 60 in the longitudinal direction.

In the embodiment and variations described above, liquid crystal mirror 40 in through-hole 63 may be replaced with, as a polarizing member, a polarizing plate including a polarized light filter on a flat plate. This configuration provides the following advantages.

When intensive outside light such as headlight is directly or indirectly incident on first mirror 10 (i.e., the Fresnel mirror), the outside light may be reflected by first mirror 10 and second mirror 20 and enter eye 201 of observer 200. At this time, the reflection of the Fresnel mirror surface of first mirror 10 may cause a linear bright line to hit second mirror 20. The linear bright line is generated by reflection of some of the rays by steps 142 (see FIG. 2) of the plurality of smaller reflecting surfaces 14 on first mirror 10 in directions other than the regular reflection. A configuration including liquid crystal mirror 40 includes a polarizer in liquid crystal mirror 40 itself. Since a polarizer is advantages in reducing the incident outside light, the linear bright line is less generated by the reflection of light by the Fresnel mirror surface.

On the other hand, if liquid crystal mirror 40 needs no mirror switching function, liquid crystal mirror 40 may be replaced with a polarizing plate. The polarizing plate serves to reduce the linear bright line generated by the reflection of light by the Fresnel mirror surface.

Note that the linear bright line generated by the reflection of light by the Fresnel mirror surface includes more polarized light (e.g., P-polarized light) in a specific direction depending on the conditions. The transmission axis of the polarizer included in liquid crystal mirror 40 or the polarizing plate only needs to be set to the direction in which the linear bright line less occurs. The transmission axis of the polarizing member (e.g., the polarizer included in liquid crystal mirror 40 or the polarizing plate) is set to the direction in which the linear bright line is less generated by the reflection of light by the Fresnel mirror surface. This setting reduces the linear bright line hitting second mirror 20.

If display device 2 is a liquid crystal display, display surface 2A has a polarized light filter. The direction of the transmission axis of the polarized light of the rays emitted from display surface 2A is aligned with the direction of the transmission axis of the polarized light of the polarizing plate at through-hole 63. This alignment reduces attenuation of the rays emitted from display surface 2A.

Figure 14:
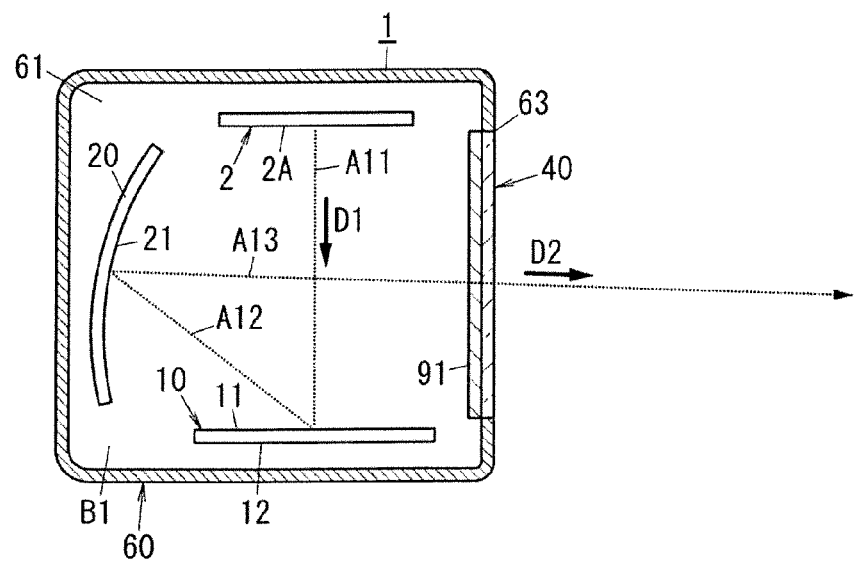
FIG. 14 is a schematic cross-sectional view of an electronic mirror system according to another variation.

As shown in FIG. 14, $\lambda/4$ retarder (or first $\lambda/4$ retarder) 91 may be located on the surface of liquid crystal mirror 40 at the inside of case 60. In this case, the transmission axis of the polarizer included in liquid crystal mirror 40 is inclined 45° with respect to the slow axis of $\lambda/4$ retarder 91 in one preferred embodiment. Accordingly, the rays incident into case 60 through the polarizer included in liquid crystal mirror 40 become P-polarized light and then become, after being transmitted by $\lambda/4$ retarder 91, circularly polarized light. After that, the rays are directly or indirectly incident on first mirror 10 and then incident on $\lambda/4$ retarder 91 again. After being transmitted by $\lambda/4$ retarder 91, the rays become then S-polarized light, almost all of the rays are thus absorbed by the polarizer of liquid crystal mirror 40. Such the light path reduces the linear bright line generated by the Fresnel mirror surface.

If a polarizing plate is located in through-hole 63 instead of liquid crystal mirror 40, $\lambda/4$ retarder (or first $\lambda/4$ retarder) 91 only needs to be located on the polarizing plate at the inside of case 60. This arrangement reduces the linear bright line generated by the Fresnel mirror surface.

Figure 15:
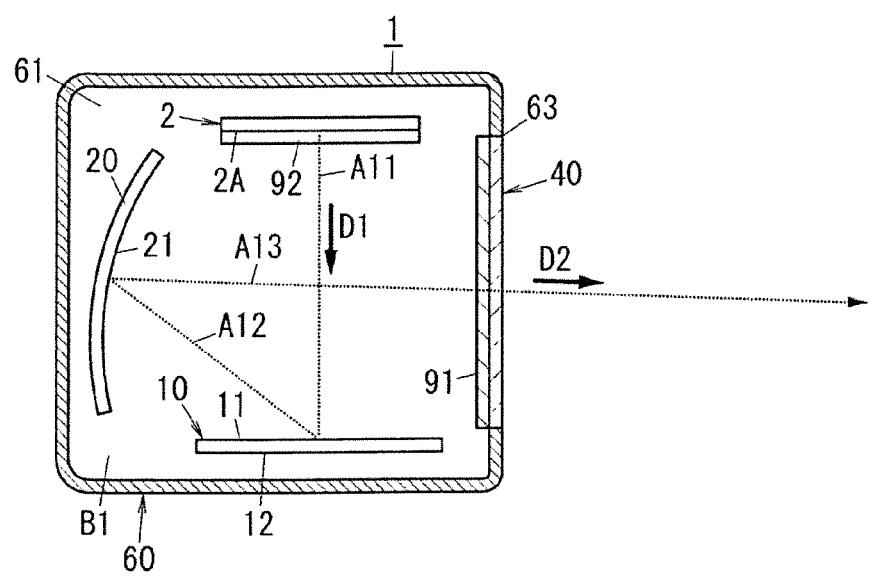
FIG. 15 is a schematic cross-sectional view of an electronic mirror system according to further another variation.

In this configuration, as shown in FIG. 15, $\lambda/4$ retarder (or second $\lambda/4$ retarder) 92 is also located on the polarized light filter of display surface 2A of display device 2 in one preferred embodiment. In this case, the slow axis of second $\lambda/4$ retarder 92 is inclined 45° with respect to the transmission axis of the polarizer included in liquid crystal mirror 40, in one preferred embodiment. Accordingly, if the rays emitted from display surface 2A are S-polarized light, the rays transmitted by second $\lambda/4$ retarder 92 become circularly polarized light and then pass through the reflected light path of first mirror 10 and second mirror 20 in this order. After that, the reflected light is incident on first $\lambda/4$ retarder 91 on liquid crystal mirror 40, becomes, after being transmitted, P-polarized light, and is then transmitted by liquid crystal mirror 40. Through this light path, the rays emitted from display surface 2A can be efficiently guided to eye 201 of observer 200.

In display system 1 shown in FIG. 15, if a polarizing plate is located in through-hole 63 instead of liquid crystal mirror 40, λ/4 retarder (or first λ/4 retarder) 91 only needs to be located on the polarizing plate at the inside of case 60. This arrangement reduces the linear bright line generated by the Fresnel mirror surface, as described above.

While being applied to electronic mirror system 4 in the embodiment and variations described above, display system 1 may be used for purposes other than electronic mirror system 4.

Display system 1 and electronic mirror system 4 according to the embodiment described above are applicable not only to moving object 100 such as a motor vehicle but also to a moving object, such as a motorcycle, train, airplane, construction machine, or ship, other than a motor vehicle.

Conclusion

As described above, the display system (1) according to a first aspect includes: the display device (2), the first mirror (10), and the second mirror (20). The display device (2) has the display surface (2A) that displays the first image (G1). The light emitted by the display device (2) is directly or indirectly incident on the first mirror (10). The first mirror (10) reflects the incident light. The light reflected by the first mirror (10) is directly or indirectly incident on the second mirror (20). The second mirror (20) reflects the incident light toward the eye-box (E1). The light reflected by the second mirror (20) enters eye (201) of the observer (200) present within the eye-box (E1) to display, on the eye (201) of the observer (200), the second image (G2) based on the first image (G1). The first mirror (10) is the Fresnel mirror.

According to this aspect, being the Fresnel lens, the first mirror (10) can be miniaturized. As a result, a miniaturized display system (1) can be achieved.

In a second aspect, in the display system (1) according to the first aspect, the first mirror (10) includes the plurality of smaller reflecting surfaces (14), each in the strip shape, aligned on the surface (11) facing the display device (2). Each of the plurality of smaller reflecting surfaces (14) reflects the light incident from the first direction, into the second direction that obliquely intersects the first direction.

According to this aspect, the first mirror (10) being the Fresnel mirror can be miniaturized.

In a third aspect, in the display system (1) according to the second aspect, the first mirror (10) is disposed such that the step (142) between each adjacent pair of the smaller reflecting surfaces (14) is parallel to the direction (A11) of the light incident on the first mirror (10) or the direction (A12) of the light reflected by the first mirror (10).

According to this aspect, the vignetted part of reflected light (the light at F1 in FIG. 6) or the part of the incident light is reflected by the steps (142) to become stray light inside the housing chamber (61). This configuration reduces possible degradations in the quality of the second image (G2).

In a fourth aspect, in the display system (1) according to the third aspect, the step (142) between each adjacent pair of smaller reflecting surfaces (14) is in the dark color.

According to this aspect, the part of incident light is reflected at the steps (142) to become stray light inside the housing chamber (61). This configuration reduces possible degradations in the quality of the second image (G2).

In a fifth aspect, the display system (1) according to any one of the first to fourth aspects further includes: the half mirror (80) on which the light reflected by the first mirror (10) is incident. The light reflected by the half mirror (80) is incident on the second mirror (20). The light reflected by the second mirror (20) is transmitted by the half mirror (80) and enters eye (201) of the observer (200).

According to this aspect, the light is reflected three times, namely by the first mirror (10), the half mirror (80), and the second mirror (20). Accordingly, the display system (1) can be miniaturized while securing the optical path length from the display device (2) to the second mirror (20).

In a sixth aspect, the display system (1) according to the first aspect further includes: the third mirror (30). The light emitted by the display device (2) is directly incident on the third mirror (30). The third mirror (30) reflects the incident light toward the first mirror (10). The first mirror (10) includes the plurality of smaller reflecting surfaces (14), each in the strip shape, aligned on the surface facing the third mirror (30). Each of the plurality of smaller reflecting surfaces (14) reflects the light incident from the first direction, into the second direction that obliquely intersects the first direction.

According to this aspect, the light is reflected three times, namely by the third mirror (30), the first mirror (10), and the second mirror (20). Accordingly, the display system (1) can be miniaturized while securing the optical path length from the display device (2) to the second mirror (20).

In a seventh aspect, in the display system (1) according any one of the first to sixth aspects, the first mirror (10) magnifies or reduces and reflects the first image (G1) displayed on the display surface (2A).

According to this aspect, the first mirror (10) magnifies or reduces the first image (G1) to adjust the size of the second image (G2).

In an eighth aspect, in the display system (1) according the any one of first to seventh aspects, at least one of the surface (11) of the first mirror (10) facing the display device (2) and the display surface (2A) of the display device (2) is inclined with respect to the observation direction of the eye (201) of the observer (200) so as not to be visible from the eye (201) of the observer (200) within the eye-box (E1).

According to this aspect, the possibility that an unnecessary object is viewed by the eye (201) of the observer (200) decreases.

In a ninth aspect, in the display system (1) according any one of the first to eighth aspects, the second mirror (20) has different magnification/reduction rates in the vertical direction and the transverse direction of the second image (G2).

According to this aspect, the second mirror (20) adjusts the magnification/reduction rates in the vertical direction and the transverse direction.

In a tenth aspect, the display system (1) according to any one of the first to ninth aspects further includes the polarizing member on the light path of the light reflected by the second mirror (20) and reaching the eye-box (E1).

According to this aspect, the linear bright line is less generated by the reflection by the Fresnel mirror.

In an eleventh aspect, in the display system (1) according the tenth aspect, the transmission axis of the polarizing member is set to the direction in which the linear bright line is less generated by the reflection by the Fresnel mirror.

According to this aspect, the linear bright line is less generated by the reflection by the Fresnel mirror.

In a twelfth aspect, the display system (1) according the tenth aspect further includes: the λ/4 retarder (91) on the surface of the polarizing member facing the second mirror (20). The slow axis of the λ/4 retarder (91) is inclined 45 degrees with respect to the transmission axis of the polarizing member.

According to this aspect, the linear bright line is less generated by the reflection by the Fresnel mirror.

In a thirteenth aspect, the display system (1) according to the tenth aspect further includes the first λ/4 retarder (91)

and the second λ/4 retarder (92). The first λ/4 retarder (91) is located on the surface (21) of the polarizing member facing the second mirror (20). The second λ/4 retarder (92) is located on the display surface (2A) of the display device (2). The slow axis of the first λ/4 retarder (91) is inclined 45 degrees with respect to the transmission axis of the polarizing member. The slow axis of the second λ/4 retarder (92) is inclined 45 degrees with respect to the transmission axis of the polarizing member.

According to this aspect, the light emitted from the display device (2) is efficiently guided to the eye (201) of the observer (200).

In a fourteenth aspect, in the display system (1) according to the tenth to thirteenth aspects, the polarizing member is the polarizer in the liquid crystal mirror (40) or the polarizing plate.

According to this aspect, the linear bright line is less generated by the reflection by the Fresnel mirror.

The electronic mirror system (4) according to a fifteenth aspect includes: the display system (1) according to any one of the first to fourteenth aspects, and the camera (3) that is mounted in the moving object (100) and images the area behind the moving object (100). The display device (2) displays, on the display surface (2A), the first image (G1) based on the image captured by the camera (3).

According to this aspect, a miniaturized electronic mirror system (4) can be achieved.

In a sixteenth aspect, the electronic mirror system (4) according to the fifteenth aspect further includes the corrector that corrects the aspect ratio of the second image (G2). The corrector includes at least one of the image corrector (71) and the optical system (302). The image corrector (71) adjusts the aspect ratio of the first image (G1) to be displayed on the display surface (2A) so as to correct the aspect ratio of the second image (G2). The optical system (302) is mounted in the camera (3) and collects the light from the area to be imaged, into the image sensor (301) of the camera (3). The optical system (302) has different magnification rates in the vertical direction and the transverse direction of the image captured by the camera (3).

According to this aspect, the aspect ratio of the second image (G2) can be corrected.

In a seventeenth aspect, the electronic mirror system (4) according to the sixteenth aspect, the image corrector (71) further performs the image processing of the distortion correction of the first image (G1) so as to compensate the distortions of the second image (G2).

According to this aspect, the distortions of the second image (G2) can be reduced.

The configurations according to the second to fourteenth aspects are not essential to the display system (1) and may be omitted as appropriate.

The configurations according to the fifteenth to seventeenth aspect are not essential to the electronic mirror system (4) and may be omitted as appropriate.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by reference in their entirety: Japanese Patent Application No. 2019-185417 filed on Oct. 8, 2019 and Japanese Patent Application No. 2020-100344 filed on Jun. 9, 2020.

The invention claimed is:

1. A display system, comprising:
    a display device including a display surface that displays a first image;
    a first mirror on which light emitted by the display device is directly or indirectly incident and which reflects the light incident;
    a second mirror on which the light reflected by the first mirror is directly or indirectly incident and which reflects the light incident toward an eye-box;
    a polarizing member on a light path of the light reflected by the second mirror and reaching the eye-box; and
    a first λ/4 retarder on a surface of the polarizing member facing the second mirror, wherein
    the light reflected by the second mirror enters an eye of an observer present within the eye-box to display, on the eye of the observer, a second image based on the first image, and
    the first mirror is a Fresnel mirror,
    a transmission axis of the polarizing member is set to a direction in which a linear bright line, that is generated by a reflection of the Fresnel mirror in a direction other than a regular reflection of the Fresnel mirror, is reduced, and
    a slow axis of the first λ/4 retarder is inclined 45 degrees with respect to the transmission axis of the polarizing member.

2. The display system according to claim 1, wherein
    the first mirror includes a plurality of smaller reflecting surfaces, each in a strip shape, aligned on a surface facing the display device, and
    each of the plurality of smaller reflecting surfaces reflects light incident from a first direction, into a second direction that obliquely intersects the first direction.

3. The display system according to claim 2, wherein
    the first mirror is disposed such that a step between each adjacent pair of the plurality of smaller reflecting surfaces is parallel to a direction of the light incident on the first mirror or a direction of the light reflected by the first mirror.

4. The display system according to claim 2, wherein
    the step between each adjacent pair of the plurality of smaller reflecting surfaces is in a dark color.

5. The display system according to claim 1, further comprising:
    a half mirror on which the light reflected by the first mirror is incident, wherein
    the light reflected by the half mirror is incident on the second mirror, and
    the light reflected by the second mirror is transmitted by the half mirror and enters the eye of the observer.

6. The display system according to claim 1, further comprising:
    a third mirror on which the light emitted by the display device is directly incident and which reflects, toward the first mirror, the light incident, wherein
    the first mirror includes a plurality of smaller reflecting surfaces, each in a strip shape, aligned on a surface facing the third mirror, and
    each of the plurality of smaller reflecting surfaces reflects light incident from a first direction, into a second direction that obliquely intersects the first direction.

7. The display system according to claim 1, wherein the first mirror magnifies or reduces and reflects the first image displayed on the display surface.

8. The display system according to claim 1, wherein at least one of the surface of the first mirror facing the display device and the display surface of the display device is inclined with respect to an observation direction of the eye of the observer so as not to be visible from the eye of the observer within the eye-box.

9. The display system according to claim 1, wherein the second mirror has different magnification/reduction rates in a vertical direction and a transverse direction of the second image.

10. The display system according to claim 1, further comprising:
a second λ/4 retarder on the display surface of the display device, wherein
a slow axis of the first λ/4 retarder is inclined 45 degrees with respect to the transmission axis of the polarizing member, and
a slow axis of the second λ/4 retarder is inclined 45 degrees with respect to the transmission axis of the polarizing member.

11. The display system according to claim 1, wherein the polarizing member is a polarizer in a liquid crystal mirror or a polarizing plate.

12. An electronic mirror system, comprising:
the display system according to claim 1; and
a camera that is mounted in a moving object and images an area behind the moving object, wherein
the display device displays, on the display surface, the first image based on an image captured by the camera.

13. The electronic mirror system according to claim 12, further comprising:
a corrector that corrects an aspect ratio of the second image, wherein
the corrector includes at least one of:
an image corrector that adjusts an aspect ratio of the first image to be displayed on the display surface so as to correct the aspect ratio of the second image; and
an optical system that is mounted in the camera and collects light from an area to be imaged, into an image sensor of the camera, and
the optical system has different magnification rates in a vertical direction and a transverse direction of the image captured by the camera.

14. The electronic mirror system according to claim 13, wherein
the image corrector further performs image processing of correcting distortion of the first image to be displayed on the display surface so as to reduce distortions of the second image.

* * * * *